United States Patent [19]
Frei et al.

[11] 3,892,301
[45] July 1, 1975

[54] BICYCLE BRAKE

[75] Inventors: Karl Frei, Horseheads; Gerald E. Ripley, Painted Post, both of N.Y.

[73] Assignee: The Bendix Corporation, Southfield, Mich.

[22] Filed: Mar. 29, 1971

[21] Appl. No.: 129,095

[52] U.S. Cl. .................. 192/6 R; 192/6 A; 188/26
[51] Int. Cl. ............................................. F16d 67/02
[58] Field of Search ......... 192/6 R, 6 A, 19; 188/26

[56] References Cited
UNITED STATES PATENTS

| | | | |
|---|---|---|---|
| 1,189,355 | 7/1916 | Ellett | 192/6 R |
| 2,572,182 | 10/1951 | Mueller | 192/6 R X |
| 2,613,763 | 10/1952 | Campbell | 192/6 R X |
| 3,252,552 | 5/1966 | Gleasman et al. | 192/6 R |
| 3,650,363 | 3/1972 | Cristie | 192/6 A |

*Primary Examiner*—Benjamin W. Wyche
*Attorney, Agent, or Firm*—B. A. Yungman; W. S. Thompson; R. J. Eifler

[57] ABSTRACT

A wheel hub enclosed bicycle coaster brake having drive means at one hub side and brake actuating means at the other. The brake is characterized by an arrangement of providing a fixed anchor member extending from the hub and a concentrically arranged brake actuator device supported by the anchor member.

1 Claim, 3 Drawing Figures

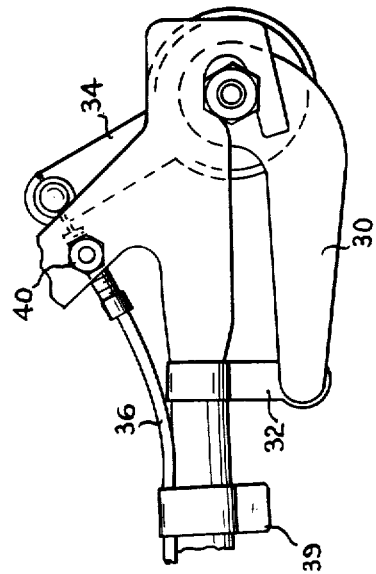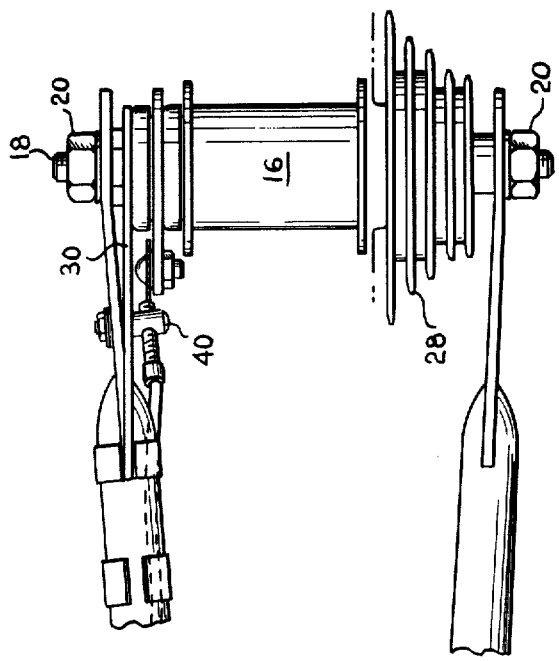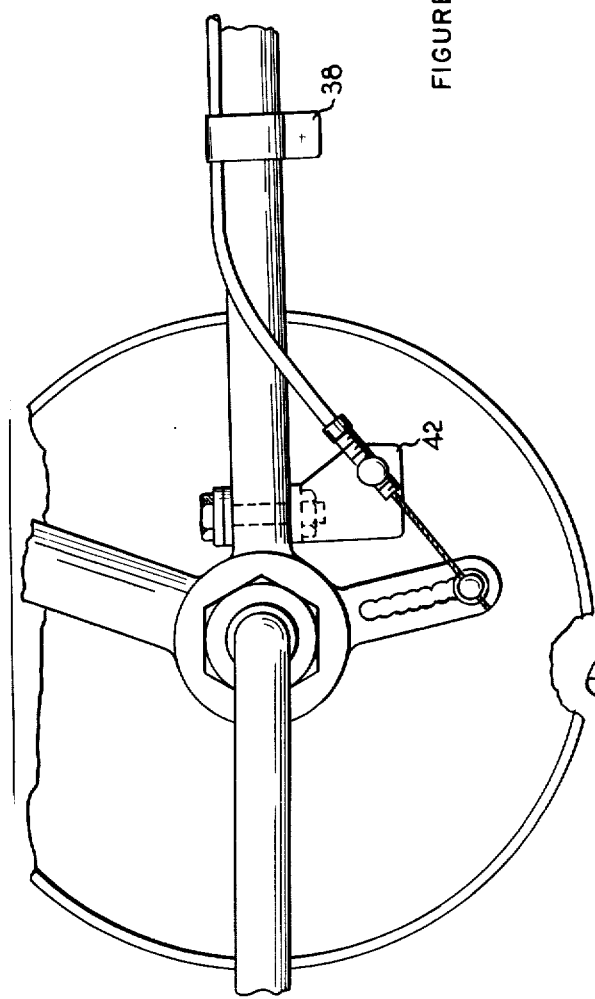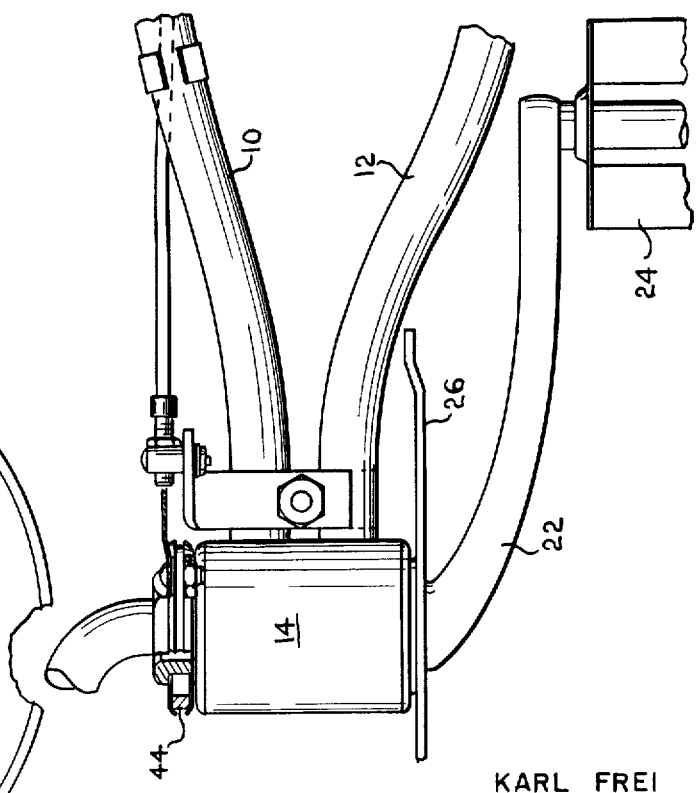
FIGURE 1
FIGURE 2
KARL FREI
GERALD E. RIPLEY
INVENTORS

KARL FREI
GERALD E. RIPLEY
INVENTORS

BICYCLE BRAKE

BACKGROUND OF THE INVENTION

A hub enclosed foot actuated coaster brake has several distinct advantages over hand squeeze grip operated caliper brakes or similar brake systems. The foot pedal operated coaster brake is usually more robust, is protected within an enclosing wheel hub, and is actuated by strong leg power. Thus, very strong braking forces can be developed and less susceptibility to environmental dirt and moisture is encountered. In certain brake types it is not practical to actuate the coaster brake through the drive chain or even on the bike side having the sprocket-chain drive such as with the multi-drive ratio derailleur type bicycle drives. In the case of multi-ratio derailleur drives the mechanism is so complex and space consuming that to add a brake actuator to the same side will be impractical from an operating and service standpoint and will limit the total available drive ratios by diverting limited available space to another use.

DESCRIPTION OF THE PRIOR ART

U.S. Pat. Nos. 3,252,552 and 3,252,551 show and describe prior art wheel hub contained coaster brakes for bicycles of the type that would serve both as drive transmitting mechanisms and as braking mechanisms, depending on whether the drive sprocket is forwardly or rearwardly driven through a drive chain mechanism. These mechanisms are for use with single drive ratio sprocket and chain mechanisms which have very little slack chain. It is not practical to use such brake arrangements when the chain drive has considerable slack and fragile take-up devices such as derailleur multi-ratio drives. On solution to this problem is described in U.S. Pat. No. 3,506,100 where two sprocket chain mechanisms are arranged side by side, one of the derailleur type and one for braking. However, this arrangement subtracts from the total space available for additional drive sprockets and places the somewhat unstable and complex derailleur drive chain mechanism next to another moving chain system which will increase the probability of interference with the chain drive and impose serviceability problems.

SUMMARY OF THE INVENTION

A hub enclosed bicycle drive and coaster brake mechanism having drive means at one hub side and brake actuating and anchoring means at the other hub side. The brake actuating means is mounted concentrically about a sleevelike anchor or brake reaction member, both of which extend through the same brake side for anchoring to bike frame and remote brake actuation. The arrangement permits use of the bike with separate derailleur drive and brake actuating mechanisms disposed on opposite sides.

DESCRIPTION OF THE DRAWINGS

FIG. 1 is a partial and broken away side view of a bicycle showing pedal drive sprocket and rear wheel hub areas and particularly illustrating the foot operated brake actuating mechanism of this invention;

FIG. 2 is a partial and broken away plan view of the same bicycle portion illustrated in FIG. 1 which illustrates both brake actuating mechanism and location of derailleur type drive sprockets.

DETAILED DESCRIPTION OF THE DRAWINGS

Figure 3:
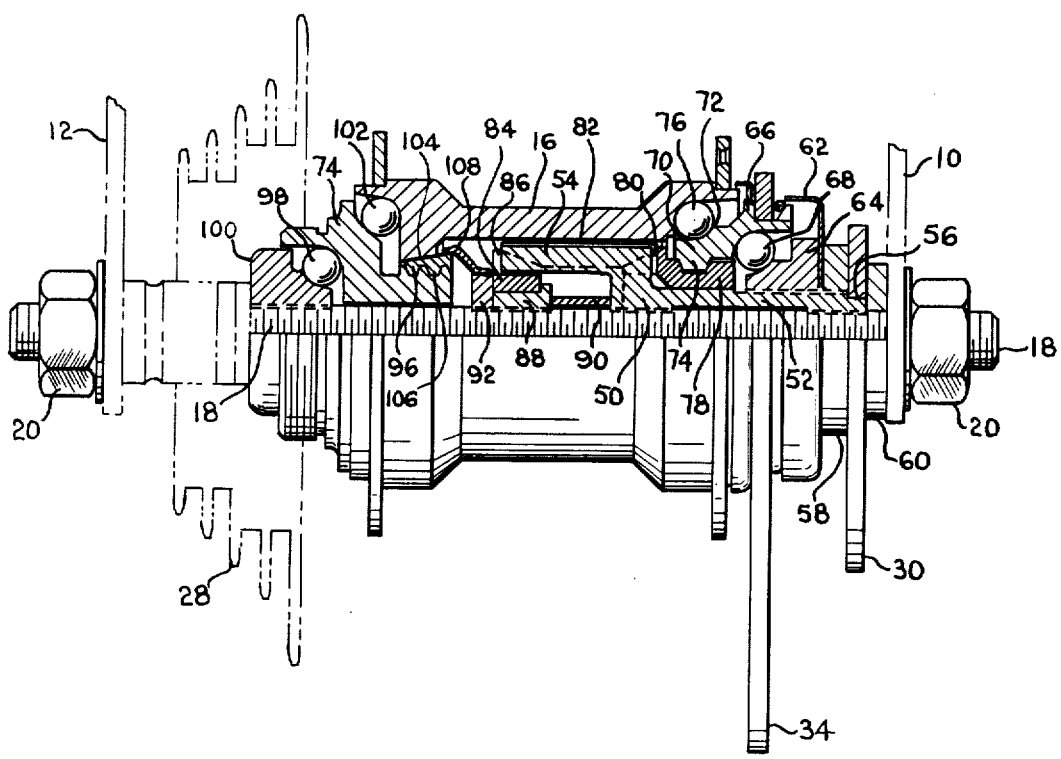
FIG. 3 is a partial cross-sectional view of a coaster brake and drive hub mechanism illustrating the operating mechanism.

Referring to FIGS. 1 and 2, the bicycle frame parts are generally designated as numerals 10 and 12 for the bifurcated frame running from pedal bearing housing 14 to the rear wheel hub 16 in a conventional manner. Hub 16 is rotatably mounted on fixed axle 18 which extends through the terminal ends of frame arms 10 and 12 and is affixed by attachment nuts 20. A crank arm mechanism 22 is rotatably mounted in housing 14 and has a foot pedal at each end, one of which is designated by numeral 24. A chain drive sprocket 26 is fixed to the crank arm mechanism and rotates therewith. Adjacent the hub 16 there is illustrated a multiple sprocket drive member 28 of the type utilized with derailleur multipleratio chain drive systems. A mechanism, not shown, is utilized to selectively transfer a slack drive chain to the various diameter drive sprockets contained on the drive sprocket 28. It is also well known to have multiple sprockets attached to the crank arm mechanism for still greater available drive ratios.

Hub 16 contains a coaster brake which has a fixed anchor arm 30 fixed to frame 10 by strap 32. The anchor arm is located on the hub side opposite sprocket 28. A brake actuating lever 34 is also contained on the brake side opposite sprocket 28 and is connected to a Bowdin wire cable 36 which runs along frame 10 and is secured thereto by clamps 38. The ends of the protective sheath of cable 36 are secured by anchor pin 40 near the hub and by bracket 42 near the crank arm assembly. A one-way clutch 44 which may, for example, be of the roller clutch type is mounted on the crank arm crossover shaft on the side opposite sprocket 26 and contains an extending integral actuating arm 46 which is attached to wire cable 36. When the crank arm assembly 22 is pedaled forwardly clutch 44 overruns, but on backpedaling the clutch engages and rotates lever 46 clockwise which actuates brake lever 34 through wire cable 36.

Turning now to FIG. 3, a rear view of the hub contained coaster brake and drive mechanism is shown and is a partial section (upper half) and partial elevational view. The frame arms 10 and 12 secure fixed shaft 18 through attachment nuts 20. Shaft 18 passes through the entire assembly extending from both sides of the frame members. A fixed brake torque receiving or reaction member 50 is concentrically mounted on shaft 18 and consists of a first cylindrical sleeve portion 52 and a second portion 54 consisting of one or more axially extending fingers projecting through the midsection of the brake assembly just inward of the inner diameter of hub 16. Torque receiving member 50 is fixedly attached to fixed anchor arm 30 such as by a square interfitting hole and shaft connection at location 56 so that member 50 is firmly held against rotation by connection to the bicycle frame. Spacers 58 and 60 are disposed on the opposite sides of fixed anchor arm 30. Inwardly of spacer 58 is a thin metal dust cover 62 which is held by bearing cone or inner race member 64 which threadedly engages the outer surface of the cylindrical portion 52 of torque receiving member 50. An intermediate rotatable annular brake member 66 is supported by ball bearings 68 and is connected to brake actuating lever 34 for limited angular movement.

The intermediate annular brake member has a cylindrical extension 70 which has a bearing race 72 formed on its external surface and a helical screw thread 74 formed on its internal surface. Ball bearings 76 support the right end of wheel hub 16 and ride in race 72. An axially movable brake actuator or expander 78 has complementing helical threads on its outer surface which engage threads 74 of the intermediate member. The left terminal portion of the axial brake actuator is formed as a wedge or conical projection 80 on which rests an arcuate brake shoe 82. The configuration of brake shoe 82 is conventional in form and may be, for example, of the type illustrated in U.S. Pat. No. 3,252,551. The conical projection 80 has a slot through which the axially extending finger 54 passes. The left side of brake shoe 82 is supported by conical annular anchor 84 which also contains a slot 86 to receive and retain the free end of finger 54. Conical anchor is mounted on bushing 88 which is positioned a known distance from the sleeve portion 52 by a spacer 90. Nut 92 threadedly engages shaft 18 and fixes bushing 88, spacer 90 and conical anchor 84 in fixed position.

In operation, as lever 34 is moved in a direction to apply the brake intermediate member 70 is rotated and through its helical connection causes brake actuator 78 to move to the left as viewed in FIG. 3. Leftward movement of the brake actuator wedges conical projection 80 further under the brake shoe 82 causing the brake shoe to move radially outwardly and frictionally engage the inner cylindrical surface of hub 16. Circumferential motion of the brake shoe is prevented by abutment with finger 54 which serves as a reaction member to absorb the braking force. As brake lever 34 is moved back, brake actuator and conical wedge 80 are retracted and brake shoe 82 is allowed to move away from hub 16.

The forward driving motion for wheel hub 16 is transmitted through multiratio sprocket 28 through an intermediate drive member 74, force-retarder clutch 96 to the hub 16. Intermediate drive member 74 is rotatably supported by ball bearings 98 which ride in an annular groove form on fixed bearing cone 100. Another set of ball bearings 102 on the outer surface of the intermediate drive member support the left side of hub 16.

The force-retarder clutch 96 has a conical outer surface 104 complementary to a confronting conical surface form in the mating hub portion. The inside surface of the clutch member 96 has helical threads 106 which engage mating threads formed on intermediate drive member 94. A spring retarder member 108 is attached to nut 92 on one end and frictionally bears against clutch member 96 to induce a retarding drag. When the bike is being propelled in a forward direction, the rotation of intermediate drive member 94 and the frictional drag imposed by retarder 108 will cause conical clutch member 96 to move to the left and frictionally engage hub 16 to transmit driving torque. Should the operator quit pedaling, hub 16 will overrun clutch 96, causing it to move to the right toward the disengaged direction.

One important characteristic of the cone-retarder type clutch is that it engages the hub very positively when high levels of driving torque are being transmitted from sprocket to hub due to the screw jack action of threads 106 which attempt to force tighter wedging engagement at surface 104 with higher forward direction loads. However, when the direction of torque transmission is reversed, as for example if one should attempt to walk the bicycle backwards, the absence of forward torque will allow the hub to slip relatively to clutch 96 and the balance of the power train. The clutch, in effect, requires forward direction torque for driving engagement and in the absence of forward applied torque permits the hub to overrun in one direction of rotation and slip in the other. If this were to be compared to the classic one-way clutches of the ratchet, sprag, roller or similar very positive directional drive types, a clear operative difference can be perceived. It is well known that a clutch with overrunning (or slip) capability must be supplied somewhere in the drive system to permit the operator to coast. It is common in derailleur drive brakes to have a ratchet type one-way clutch as part of the drive system or contained within sprocket 28. In the beforementioned prior U.S. Pat. No. 3,506,100 a roller clutch is provided between the equivalent of the intermediate member and hub. While such arrangements permit overrunning, they do not permit backwalking of the bike without back rotation of the drive sprocket. In the case where a sprocket actuated coaster brake is utilized, back rotation would in short order apply the brakes. This is a very unhandy trait when attempting to remove the bike from narrow garage, storage places or the like. In the present invention the cone clutch is force responsive and permits back slipping of the hub when no forward driving torque is applied to enable backwalking capability of the bike.

I claim:

1. A bicycle hub contained drive and coaster brake mechanism comprising: a fixed axle adapted to be secured to the bicycle frame;
   a wheel hub of generally cylindrical configuration rotatably mounted about said fixed axle;
   bearing means supporting said wheel hub about said axle at each side thereof;
   drive means rotatably supported on said fixed axle on one side of said wheel hub operative to rotate said wheel hub with rotation of the drive means;
   brake fixed anchor means supported on said fixed axle on the other side of said wheel hub and adapted to be secured to the bicycle frame;
   at least one arcuate brake shoe disposed within said wheel hub operative to selectively and frictionally engage the inner surface of said hub;
   a brake torque reaction member fixedly connected to said brake anchor means and having at least one projecting finger restraining circumferential movement of said brake shoe;
   a brake expander member concentrically mounted on said brake torque reaction member and movable in an axial direction to selectively force said brake shoe into and out of frictional engagement with said wheel hub; and
   a rotatable brake actuating member concentrically disposed about said brake torque reaction member at the same hub side containing said brake anchor means; said brake actuating member having a threaded connection with said brake expander member to impart axial movement to said expander member in response to rotational movement of said rotatable brake actuating member.

* * * * *